United States Patent Office 3,029,223
Patented Apr. 10, 1962

3,029,223
PROCESS FOR PREPARING TRANSPARENT COMPOSITIONS FROM STYRENE, METHYL METHACRYLATE AND RUBBERY COPOLYMERS OF STYRENE AND BUTADIENE AND RESINOUS PRODUCTS THEREOF
Billy B. Hibbard, Midland, Mich., assignor to The Dow Chemical Company, Midland, Mich., a corporation of Delaware
No Drawing. Filed Feb. 11, 1959, Ser. No. 792,470
2 Claims. (Cl. 260—45.5)

This invention concerns new compositions of matter which are interpolymerized mixtures of styrene, methyl methacrylate and copolymers of styrene and butadiene.

The new compositions are transparent polymeric materials possessing good tensile strength together with high elongation and impact strength. They can be calendered on rolls to form film or sheet, or molded by usual compression or injection molding operations, or by extrusion methods, to form plastic articles suitable for a variety of applications. The compositions are generally soluble in usual organic solvents, e.g. benzene, toluene, methyl ethyl ketone. Solutions of the polymeric materials in solvents can be cast as layers on glass plates and dried to form film, or applied to wood, metal, or other surfaces and dried to form tough transparent protective films or surface coatings.

It has been discovered that the interpolymerization of mixtures or solutions of styrene, methyl methacrylate and copolymers of styrene and butadiene in the definite proportions hereinafter defined, results in the formation of transparent polymeric products having good mechanical properties such as tensile strength, impact strength and elongation.

According to the invention the compositions are prepared by dissolving or dispersing a copolymer of butadiene and styrene, which copolymer contains ethylenic unsaturation (unvulcanized rubber), in a mixture of monomers consisting of styrene and methyl methacrylate in proportions hereinafter defined and heating this mixture to polymerize the monomers. The monomers copolymerize with one another and appear to graft in part to the styrene-butadiene copolymer to produce a final composition containing some copolymer and some interpolymerized products. These compositions are different from those produced by combining a styrene-butadiene copolymer with a styrene-methyl methacrylate copolymer by the usual mechanical blending techniques of Banbury mixing.

It is important that the copolymer of butadiene and styrene be uniformly dispersed or suspended in the monomers. Investigation by phase contrast light microscopy will show the system to be essentially free of particles of a visible size, but composed of particles in the order of 0.1–100 microns when initially prepared. These particles are rubber particles very highly swollen in monomer. During polymerization the particle size has been observed to change. When the finished polymer is observed by microscopic phase contrast techniques, no particles are observed since there is little, or no, refractive index difference. However, a system having a composition outside that claimed in this invention (not transparent) will reveal a particle size of about 1–20 microns.

The soluble butadiene-styrene copolymers to be employed in preparing the interpolymerized compositions are unvulcanized copolymers, i.e. they contain ethylenic unsaturation and are uniformly dispersible in the styrene and methyl methacrylate monomer systems described.

The copolymers of butadiene and styrene to be employed in preparing the composition can be copolymers containing in chemically combined form from 29 to 93.5 percent by weight of butadiene and from 71 to 6.5 percent of styrene. Copolymers prepared from 50 to 80 percent by weight of butadiene and from 50 to 20 percent by weight of styrene are preferred.

Methods of making the butadiene-styrene copolymers are well known. The copolymers are usually prepared by dispersing a mixture of the monomers in an aqueous solution of an emulsifying agent, then agitating, heating and copolymerizing the monomers.

The polymerization is accelerated by the addition of catalysts which provide free radicals such as hydrogen peroxide, benzoyl peroxide, tertiary-butyl hydroperoxide, cumene peroxide, potassium persulfate, etc. The catalyst is usually employed in amounts corresponding to from 0.1 to 2 percent by weight of the materials to be polymerized.

The butadiene-styrene copolymers are usually obtained by stopping the copolymerization short of completion, e.g. when from 70 to 90 percent by weight of the monomers are polymerized, then separating the unreacted monomers and recovering the copolymer from the latex in usual ways, such as by coagulation of the latex, washing and drying the copolymer, or by drying of the latex on heated rolls or spray drying the latex. The copolymers recovered by coagulation of the latex, washing and then drying, produce an interpolymerized product with improved transparency over similar copolymers recovered by drying of the latex on heated rolls, or spray drying the latex. These latter methods retain various materials such as inorganic salts and organic water soluble emulsifiers in the butadiene-styrene copolymer which cause haze in the final products of this invention.

Further, the APHA color rating of the butadiene-styrene copolymer gum should be as low as possible. This usually necessitates the use of colorless additives such as stabilizers and dyes; and the use of special handling conditions for superior products.

The butadiene-styrene copolymer is employed in amount sufficient to form with the styrene-methyl methacrylate monomers a uniformly dispersed system containing from 5 to 10, preferably 6 to 10 parts by weight of the butadiene-styrene copolymer per 100 parts by weight of the monomers. The employment of the butadiene-styrene copolymer in amount less than about 5 parts by weight per 100 parts of the monomers results in products having low strength. The employment of the butadiene-styrene copolymer in amount greater than 10, e.g. 15 parts, by weight per 100 parts by weight of the monomers causes difficulties in the interpolymerization process due to high viscosity and in the fabrication of the product.

Suitable monomers for this invention are styrene and methyl methacrylate. Since transparency is obtained in part through a matching of the refractive index of the butadiene-styrene copolymer with that of the final interpolymerized product, such monovinyl aromatic hydrocarbon as vinyltoluene, vinylxylene, ethyl vinylbenzene, and such alkyl esters of methacrylic acid as ethylmethacrylate, propyl methacrylate and butyl methacrylate are not applicable to this invention.

The styrene and methyl methacrylate can be used in proportions of from 30 to 70 percent by weight of the methyl methacrylate and from 70 to 30 percent of the styrene, based on 100 parts by weight of the total monomers.

The proportions of the styrene and methyl methacrylate to be employed in preparing the composition will vary depending upon the proportion of butadiene chemically combined in the rubber. The relation between the proportion of methyl methacrylate in the monomer mixture and the proportion of butadiene chemically combined in the rubber to produce the transparent compositions of the invention is defined by the equation $$y = 1.07X + c$$

wherein y represents the percent by weight of butadiene chemically combined in the butadiene-styrene copolymer employed, X represents the percent by weight of methyl methacrylate in the mixture of monomers and c is an integer from −3 to 19.

In a preferred embodiment, the compositions are prepared by the interpolymerization of a solution or homogeneous dispersion corresponding to from 5 to 10 grams of a rubbery copolymer of from 50 to 80 percent by weight of butadiene and from 50 to 20 percent of styrene, dissolved or homogeneously dispersed in 100 grams of a mixture of styrene and methyl methacrylate wherein the proportion of methyl methacrylate in the monomers is determined by the aforementioned equation, and wherein c is an integer between 6 and 10. Such compositions posses superior transparency, together with good mechical properties such as elongation, impact strength and hardness, and are preferred.

The evenly dispersed mixture or solution of the butadiene-styrene copolymer in the monomers can be prepared by first mixing the copolymer with the styrene, then adding the methyl methacrylate, or by dissolving the butadiene-styrene copolymer in a mixture of the styrene and methyl methacrylate in the desired proportions. The starting solution or homogeneous dispersion is usually prepared by stirring or agitating the mixture of the ingredients at atmospheric or substantially atmospheric pressure and at ordinary temperatures or thereabout, e.g., at temperatures between 20° and 40° C.

In practice, the butadiene-styrene copolymer is evenly dispersed in a mixture of styrene and methyl methacrylate in the desired proportions. The starting material is preferably heated in bulk, i.e. in the absence or substantial absence of an inert liquid medium to form the interpolymerized product. However, inert liquid mediums such as ethyl benzene or toluene may be used in amounts up to 20 parts by weight of the mixture and in conjunction with suitable devolatilization techniques to remove the inert liquid medium following polymerization. The polymerizations can be carried out at temperatures between 50° and 250° C., preferably from 80° to 150° C. in the presence or absence of a catalyst, essentially to completion.

The polymerization of the monomers in the mixture of the starting materials is accelerated by the addition of catalysts which provide free radicals. Examples of suitable polymerization catalysts are dibenzoyl peroxide, di-tert.-butyl peroxide, tert.-butyl hydroperoxide or $\alpha,\alpha'$-azobisisobutyronitrile. The catalyst is employed in amount corresponding to from 0.001 to 0.1 percent by weight of the materials to be interpolymerized, but is not required in the practice of the invention.

Small amounts of oil soluble dyes can be incorporated with the resinous composition in usual ways, e.g. by heat-plastifying the polymeric product on compounding rolls and milling the product with the dye or by mixing the dye in the starting materials to be interpolymerized. Examples of suitable dyes are Permansa Yellow G (Color Index 11680), Calco Oil Red N–1700 (Color Index 26120), Sudan Blue GA (Color Index 61525), Oil Blue GA (Color Index Solvent Blue 11), Quinazrine Green Base (Color Index 61565), Calco Oil Violet Z (Color Index 61705) and the like and combinations thereof. The dye is employed in amount corresponding to from 0.0001 to 0.1 percent by weight of starting materials or interpolymerized product, but the presence or absence of such dye is not required.

Small amounts of plasticizers, stabilizing agents or antioxidants can be incorporated with the resinous composition in usual ways as mentioned above. These additives when used are usually employed in amounts corresponding to from 0.1 to 10 percent by weight of the composition. Examples of suitable plasticizers are mineral oil, butyl stearate and the like. The presence of such additives is not required.

The resinous interpolymer product, either as obtained from the interpolymerization reaction, or after being subjected to one or more of the devolatilization, milling or compounding operations mentioned above may be cut or ground to form particles or granules thereof, suitable for use in molding operations.

The products of this invention may be modified by the use of chain transfer agents commonly used in systems containing styrene and methyl methacrylate. The use of such chain transfer agents generally reduces the molecular weight and results in an interpolymerized product having a lower melt viscosity than is obtained in the absence of said agent under otherwise similar conditions, but retaining good transparency, elongation and impact strength. Such chain transfer agents are benzene, toluene, ethylbenzene, ethylene dichloride, carbon tetrachloride, $\alpha$-methylstyrene dimer or tertiary butyl mercaptan. The chain transfer agent is employed in amount corresponding to from 0.001 to 0.5 percent by weight of starting materials to be interpolymerized, but is not required in practice of the invention.

The resulting interpolymer product can be devolatilized, e.g. by heating the same to its melting temperature or above, under subatmospheric pressure in a vacuum chamber, or by milling, compounding or otherwise mechanically working the product while it was in a heat-plastified condition. Milling or compounding of the heat-plastified interpolymerized product tends to improve the product by reducing the average molecular weight and lowering the melt viscosity, but retaining the transparency, elongation and impact strength. The devolatilization and hot-milling operations just mentioned are desirable, but are not required. The granular product can be compression molded, or injection molded or extruded to obtain shaped articles of the same.

The following examples illustrate ways in which the principle of the invention has been applied, but are not to be construed as limiting its scope.

EXAMPLE 1

In each of a series of experiments a rubbery copolymer of approximately 76.5 percent by weight of butadiene and 23.5 percent of styrene, having a refractive index of $N_D^{25}$ 1.5322, was mixed with a mixture of styrene and methyl methacrylate monomers in proportions as stated in the following table to form a homogeneous solution. A charge of 800 grams of the solution was placed in a tin-lined can and sealed, then was heated 4 days at 80° C., 1 day at 95° C., and 2 days at 150° C. to polymerize the monomers. The container was stripped from the block of the polymer, and it was ground to a granular form suitable for molding. Portions of the polymer were injection molded to form test pieces of ½ x ⅛ inch cross section. These test pieces were used to determine the tensile strength and percent elongation for the polymer employing procedures similar to those described in ASTM D638–56T. Impact strength was determined by employing a procedure similar to that described in ASTM D256–47T. Other molded test pieces were employed to determine a heat distortion temperature by a procedure of Heirholzer and Boyer, see ASTM Bull. No. 134 of May 1945. Transparency was determined by a visual test wherein a molded test plate of the composition ⅛ inch thick was held 0.5 inch above the printing on a U.S. patent. The composition was considered to be transparent when the printing could be read through the plastic plate by the naked eye of a person having normal vision. This test corresponds to 30 percent or greater light transmission as measured in a standard spectrophotometer with light having a wave length of 550 millimicrons. Table I identifies the compositions and gives the proportions in parts by weight of the rubbery copolymer of butadiene and styrene and the monomeric styrene and methyl methacrylate employed in making the same. The table also gives the properties determined for the compositions.

Table I

| Run No. | Starting materials | | | Product | | | | | Remarks |
|---|---|---|---|---|---|---|---|---|---|
| | Rubbery copolymer, parts | Styrene, parts | Methyl methacrylate, parts | Tensile strength, lbs./sq. in. | Elongation, percent | Notched impact strength at— | | Heat distortion temp., °C. | |
| | | | | | | 25° C., ft.-lbs. | −20° C., ft.-lbs. | | |
| 1 | 5.38 | 40 | 60 | 5,048 | 3.3 | 0.73 | 0.81 | 76 | Transparent. |
| 2 | 5.38 | 35 | 65 | 5,040 | 2.7 | 1.0 | 0.91 | 76 | Do. |
| 3 | 5.38 | 30 | 70 | 5,129 | 2.9 | 0.82 | 0.54 | 79 | Do. |
| 4 | 11.3 | 40 | 60 | 4,610 | 3.9 | 1.70 | 1.0 | 74 | Do. |
| 5 | 11.3 | 35 | 65 | 3,969 | 3.3 | 1.84 | 1.11 | 75 | Do. |
| 6 | 11.3 | 30 | 70 | 3,809 | 3.8 | 1.60 | 1.04 | 77 | Do. |

Note.—In contrast to the transparent compositions obtained in Table I, similar compositions prepared from the rubbery copolymer and a mixture of 50 percent by weight of styrene and 50 percent of methyl methacrylate were opaque.

EXAMPLE 2

In each of a series of experiments, a copolymer of approximately 78 percent by weight of butadiene and 22 percent of styrene, having a refractive index of $N_D^{25}$ 1.5305 was mixed with a mixture of monomeric styrene and methyl methacrylate in proportions as stated in the following table. A charge of the homogeneous mixture was placed in a glass bottle and was sealed. The mixture was heated 64 hours at 80° C., 24 hours at 100° C. and 48 hours at 150° C. to polymerize the monomers. The polymeric composition was cooled, removed from the bottle and was ground to a granular form. The granular polymer was mixed with one percent by weight of white mineral oil and one percent of butyl stearate. The resulting mixture was heat-plastified and blended into a uniform composition by mixing the same in a Banbury mixer at temperatures of from 410° to 420° C. for 10 minutes. It was removed, cooled and ground to a granular form. Portions of the composition were molded and tested employing procedures similar to those employed in Example 1. Table II identifies the polymeric product and gives the properties determined for the composition.

Table II

| Run No. | Starting materials | | | Product | | | | | Remarks |
|---|---|---|---|---|---|---|---|---|---|
| | Rubbery copolymer, parts | Styrene, parts | Methyl methacrylate, parts | Tensile strength, lbs./sq. in. | Elongation, percent | Notched impact strength, ft.-lbs. | Heat distortion Temp., °C. | Rockwell hardness 15 X | |
| 1 | 10 | 44 | 56 | 5,840 | 3.5 | 0.9 | 87 | 133-183 | Transparent. |
| 2 | 10 | 42 | 58 | 5,890 | 3.2 | 0.8 | 86 | 133-182 | Do. |
| 3 | 10 | 40 | 60 | 5,870 | 3.0 | 0.8 | 88 | 135-188 | Do. |
| 4 | 10 | 38 | 62 | 5,900 | 3.3 | 0.8 | 84 | 136-180 | Do. |
| 5 | 10 | 36 | 64 | 5,870 | 2.9 | 0.8 | 84 | 133-179 | Do. |

EXAMPLE 3

In each of a series of experiments, a copolymer of approximately 57 percent by weight of butadiene and 43 percent of styrene, having a refractive index $N_D^{25}$ 1.5481, was mixed with a mixture of monomeric styrene and methyl methacrylate in proportions as stated in the following table to form a homogeneous gel free mixture. A charge of the resulting mixture was sealed in a glass bottle and polymerized by heating the same as follows: 64 hours at 80° C.; 24 hours at 100° C.; and 48 hours at 150° C. The product was cooled, removed from the bottle and was ground to a granular form. The product was blended with one percent by weight of white mineral oil and one percent of butyl stearate in a Banbury mixer at temperatures of from 350°–360° C. for a period of 10 minutes, then was removed, allowed to cool and was ground to a granular form suitable for molding. Test pieces of the composition were molded and tested employing procedures similar to those employed in Example 1. Table III identifies the polymeric product and gives the properties determined for the composition.

Table III

| Run No. | Starting materials | | | Product | | | | | Remarks |
|---|---|---|---|---|---|---|---|---|---|
| | Rubbery copolymer, parts | Styrene, parts | Methyl methacrylate, parts | Tensile strength, lbs./sq. in. | Elongation, percent | Notched impact strength, ft./lbs. | Heat distortion Temp., °C. | Rockwell hardness 15 X | |
| 1 | 10 | 60 | 40 | 5,969 | 31.1 | 0.86 | 73 | 127-174 | Transparent. |
| 2 | 10 | 58 | 42 | 5,744 | 15.8 | 0.85 | 73 | 128-174 | Do. |
| 3 | 10 | 56 | 44 | 5,808 | 20.1 | 0.95 | 75 | 124-168 | Do. |
| 4 | 10 | 54 | 46 | 5,840 | 15.9 | 0.90 | 78 | 131-175 | Do. |
| 5 | 10 | 52 | 48 | 5,760 | 13.1 | 1.0 | 75 | 129-174 | Do. |

EXAMPLE 4

In each of a series of experiments, a copolymer of approximately 55 percent by weight of butadiene and 45 percent of styrene, having a refractive index of $N_D^{25}$ 1.5501 was mixed with monomeric styrene and methyl methacrylate in proportions as stated in the following table to form a gel free homogeneous solution. A charge of the mixture was polymerized employing time and temperature conditions similar to those employed in Example 3. The polymeric product was blended with one percent by weight of white mineral oil and one percent of butyl stearate, then was molded and tested employing procedures similar to those employed in Example 1. Table IV identifies the compositions and gives the properties determined for the product.

parts by weight of a copolymer of from 55 to 57 percent by weight of butadiene and from 45 to 43 percent of styrene, and 100 parts by weight of a mixture of monomers consisting of from 50 to 60 percent by weight of styrene and from 50 to 40 percent of methyl methacrylate, said methyl methacrylate being in a proportion defined by the equation $$y = 1.07X + c$$

Table IV

| Run No. | Starting materials | | | Product | | | | | Remarks |
|---|---|---|---|---|---|---|---|---|---|
| | Rubbery copolymer, parts | Styrene, parts | Methyl methacrylate, parts | Tensile strength, lbs./sq. in. | Elongation, percent | Notched impact strength, ft.-lbs. | Heat distortion Temp., °C. | Rockwell hardness 15 X | |
| 1 | 10 | 56 | 44 | 6,096 | 23.4 | 0.83 | 80 | 152-196 | Transparent. |
| 2 | 10 | 53 | 47 | 5,968 | 28.9 | 1.14 | 84 | 130-177 | Do. |
| 3 | 10 | 50 | 50 | 6,016 | 13.1 | 1.02 | 82 | | Do. |

I claim:

1. A resinous transparent composition of matter comprising an interpolymer of a homogeneous mixture of ingredients consisting essentially of from 5 to 10 parts by weight of a copolymer of from 55 to 57 percent by weight of butadiene and from 45 to 43 percent of styrene and 100 parts by weight of a mixture of monomers consisting of from 50 to 60 percent by weight of styrene and from 50 to 40 percent of methyl methacrylate.

2. A method for making a resinous transparent composition of matter which comprises a homogeneous mixture of ingredients consisting essentially of from 5 to 10 parts by weight of a copolymer of from 55 to 57 percent by weight of butadiene and from 45 to 43 percent of styrene, and 100 parts by weight of a mixture of monomers consisting of from 50 to 60 percent by weight of styrene and from 50 to 40 percent of methyl methacrylate, said methyl methacrylate being in a proportion defined by the equation $$y = 1.07X + c$$

wherein $y$ represents the percent by weight of butadiene in the butadiene copolymer, $X$ represents the percent of methyl methacrylate in the monomers and $c$ is an integer between $-3$ and $19$, and heating said mixture of ingredients at temperatures between 50° and 250° C. to polymerize said monomers.

References Cited in the file of this patent

UNITED STATES PATENTS 2,857,360    Feuer _____ Oct. 21, 1958